Dec. 5, 1972  J. D. LEE  3,705,221
METHOD OF FOAM PIPE INSULATION WITH COATING OF DEFICIENT
AREA AT TOP OF PIPE AFTER MOLD REMOVAL
Filed Sept. 14, 1970
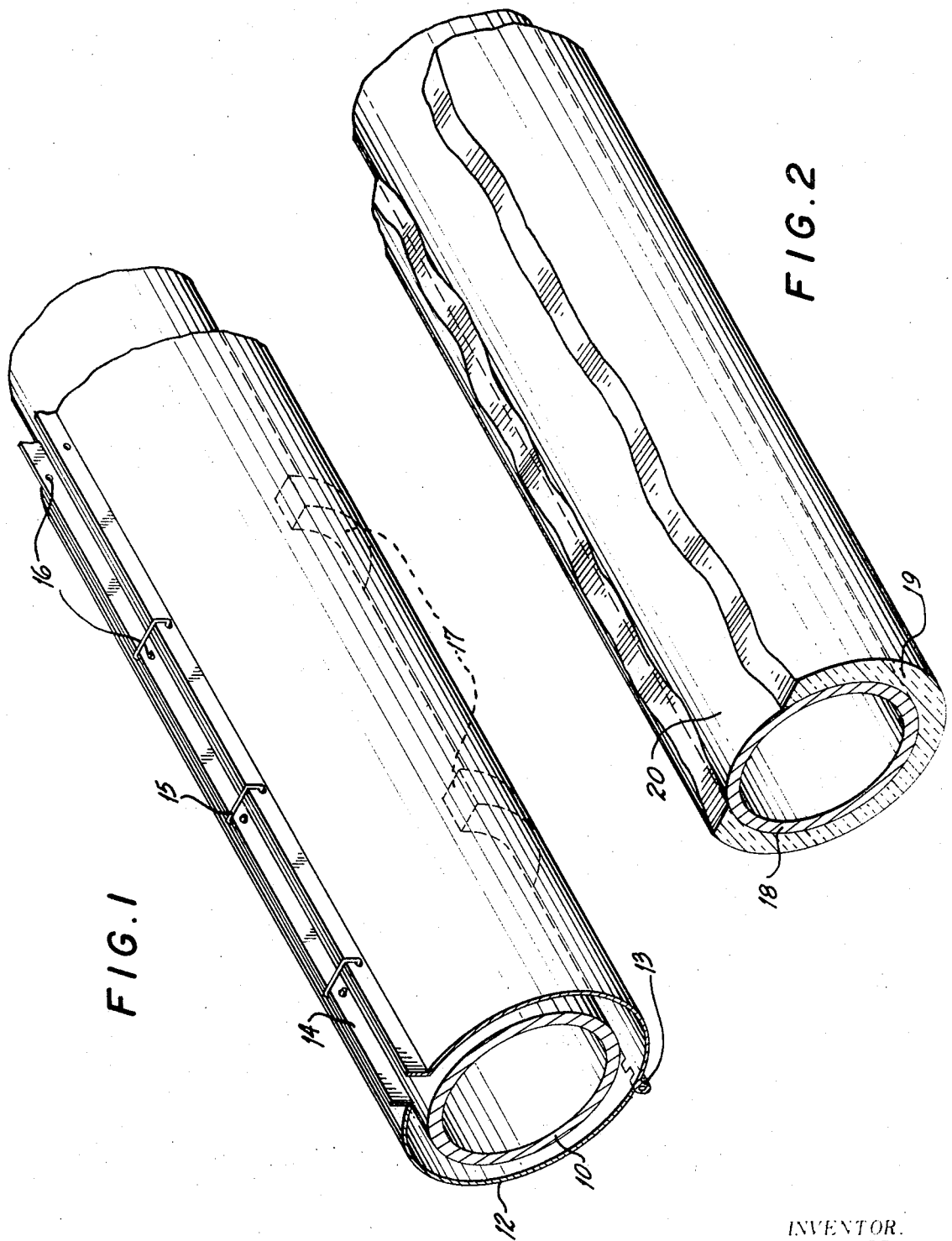
INVENTOR.
JIMMY DAVID LEE
BY
Curtis, Morris and Safford
ATTORNEYS

United States Patent Office 3,705,221
Patented Dec. 5, 1972

3,705,221
METHOD OF FOAM PIPE INSULATION WITH COATING OF DEFICIENT AREA AT TOP OF PIPE AFTER MOLD REMOVAL
Jimmy D. Lee, Houston, Tex., assignor to
Plaskolite, Inc., Columbus, Ohio
Filed Sept. 14, 1970, Ser. No. 71,923
Int. Cl. B29d 27/04
U.S. Cl. 264—45    2 Claims

ABSTRACT OF THE DISCLOSURE

A method of insulating pipelines in the field with foamable insulating material is shown. It comprises pouring foamable polyurethane components into a mold, open at the top, positioned around the pipeline and spaced therefrom at a distance equal to the desired thickness of insulation. An insufficient amount of foam is used to completely cover the pipe at the top to the desired thickness. The mold is removed from around the pipeline and insulation of the substantially continuous deficient area at the top of the pipeline is completed by hand spraying.

BACKGROUND OF THE INVENTION

The invention relates to applying foamed insulation to pipelines in the field at low cost and with a minimum of material waste and loss.

Foamable plastics and resins, such as polyurethanes, polystyrene, and epoxies, are well known for their structural and insulating properties. These materials can be made in the form of prefoamed insulation scales ready for application on a pipe, or by pouring liquid foamable materials into a mold, or by spraying the components directly on the pipe surface. Polyurethanes are particularly useful for this purpose, and since they are the most effective and commonly used materials for pipeline insulation, the invention is described using polyurethane systems. However, it is to be understood that the invention is applicable to all foamable insulation systems.

Until recently, few, relatively long pipelines required insulation since control of the temperature of transported fluids at a level differing substantially from ambient temperature was unnecessary. However, as pipelining became more sophisticated, and either very cold (such as liquified natural gas) or very hot (such as sulfur, residual oil, or viscous crude oil) materials were transported by pipeline, the use of insulation for these lines become essential. In the past, many methods for providing this insulation have been tried or proposed.

It is most common, for example, to pre-insulate the pipeline sections at a plant location. The sections are then transported to the field where they are welded together, and the weld joints are insulated by spraying or pouring in a mold. This method has the disadvantages of increased costs of transporting preinsulated pipe, risking damage to the insulation, and still having to maintain field crews to insulate the joints. To avoid damage to the pipe in transit, the material is usually foamed to contain an integral skin which forms a protective barrier, or the material is foamed against a concentric plastic sleeve which remains around the pipe for protection. An example of a process yielding an integral skin is shown in U.S. Pat. No. 3,359,351. An example of a process using a plastic sleeve is described in Engineering, Jan. 24, 1969, p. 146.

In an effort to avoid the disadvantages of the using preinsulated pipe, several attempts have been made to develop a method for field or "over-the-ditch" methods of pipeline insulation, wherein the insulation is applied after the pipe sections have been welded together. In one method, preformed foam slabs are bonded to the pipeline. This method is disadvantageous because the slabs must be foamed in a factory and shipped to the field location. Another method has been to simply spray the pipe with foam as it sits in place. However, this method results in large wastes of foam material, which is quite expensive. Finally, several attempts have been made to design line-traveling machines which will move along the line and insulate the pipe. None of these machines have even been perfected, however.

It has now been discovered that foamed insulation can be applied in the field to jointed pipe sections by the following method. First, a mold is positioned concentrically around a section of the pipeline at a distance from the pipeline approximately equal to the desired insulation thickness. The mold is open at the top. An operator walks along the mold and pours foamable polyurethane components into the mold in an amount such that the foam rises in the mold around the pipeline but does not completely cover the top of the pipe. After the foam becomes firm, the mold is removed, and the adjoining section of pipe can be similarly insulated. The insulation deficiency at the upper part of the pipe surface is easily supplied by a hand spray gun. One of the most important aspects of the invention is the use of an open mold and a deficiency of insulation in the first pouring, such that a tough integral skin barrier is not formed, and foam is not wasted through overflow of the mold. The term "deficiency of insulation" refers to an amount of foam less than that required to completely insulate the pipeline throughout its circumference to the desired thickness.

The invention will be further explained by way of example with reference to the accompanying drawing, in which:

FIG. 1, is a perspective view of the open-top mold in place around the pipeline; and FIG. 2 is a perspective view of a section of pipe after the insulation has been poured and the mold removed, but before the finishing hand spray has been applied.

FIG. 1 shows a section of pipe 10 to be insulated with an open-top mold 12 spaced concentrically around it. The mold, which consists of two pieces of sheet metal hinged together at 13, has small flanges at the open top 14. The mold is held in place by removable brackets 15 placed in holes 16 in the flanged top. The mold is maintained at the appropriate distance from the pipe by preformed polyurethane spacers 17 which are placed in the bottom of the mold. Alternatively, a simple spacing element can be built directly into the mold.

After the mold is in place, an operator with a high-volume mixing gun walks along the pipeline, pouring the liquid foam components into the mold. The foam components reach the bottom of the mold as a liquid, but quickly react and foam up around the pipeline in a substantially uniform manner. An experienced operator can gauge the proper flow of components to the mold visually, applying an amount such that the resulting foam covers at least the bottom one-half, preferably at least the bottom three-quarters of the pipe, but does not overflow the mold. While ideally the amount of material applied would form a uniform coat over the whole pipe, it is extremely difficult to determine the proper amount while walking along the line. Therefore, in accordance with the invention, the foam components are intentionally supplied in deficiency for complete coating, assuring no waste of the expensive components.

As shown in FIG. 2 pipe 18 is not completely covered with insulation 19. Its upper surface 20 is exposed and is subsequently covered with supplementary insulating material.

After the foam becomes firm, the mold is removed. The time for the foam to set up is generally governed by the type and relative amounts of urethane components and catalyst; in general it is less than five, and preferably less than two minutes. Release of the mold is facilitated by the use of a lining in the mold of a material to which the polyurethane foam will not adhere. Examples of such materials are polyethylene, polypropylene, polystyrene, polyvinylchloride, and fluorocarbons such as polytetrafluoroethylene. This lining may be permanently bonded to the inner surface of the mold, or, in an especially preferred aspect of the invention, may be inserted in the mold as film sheet prior to placing the mold around the pipeline. When a film sheet liner is used, it may be either discarded or reused when the mold is removed from the insulated pipeline. It is also possible to use a film liner to which the foam adheres, such that when the mold is removed, the film liner remains attached to the rigid foam surface.

By appropriate coordination of several workcrews, several sets of molds may be in use on adjoining sections of pipeline, and one or more miles of pipeline can easily be insulated in one day by this method. When one mold is removed, it is then placed on the pipeline at the next section to be insulated.

The molds may be made of any material which is sufficiently rigid to hold the foaming material to the desired thickness. Sheet metal, such as steel, is appropriate. If the molds are made from a plastic, however, such as polyethylene or polypropylene, it would not be necessary to use an inside liner to prevent adhesion of polyurethane foam to the mold. The individual molds may be of any convenient length which will generally be the longest possible mold which is easily handled. It should be at least 5 feet long, preferably about 10-15 feet long. For larger pipe diameters, auxiliary power equipment may be needed to handle the molds. With the use of such auxiliary equipment, the process of the invention may be used on any size pipe. Pipelines may typically range in diameter from 2" or smaller up to 54". Up to sizes of pipe of about 16", the lifting of pipe and placement of molds can be done manually.

The insulation of pipe in the field by this invention is generally performed while the pipe is sitting along side of the ditch (if the line is to be buried). The pipe is lifted and placed on blocks, and insulation is applied with the molds. Then, the top of the pipe is insulated manually with a small spray gun. These spray guns are standard items which mix the foam components in the liquid form and project a small liquid stream to the area to be covered with foam. With this apparatus, an operator can fill in the deficient areas on the top of the pipeline, and can insulate any joints, valves, or bends in the pipeline which cannot be easily insulated with the molds.

If desired, coating or wrapping can be applied to the insulation to improve structural or corrosion resistance properties. Many coating or wrapping materials are available and well known to those skilled in the art. After the pipeline is completely insulated and coated, it will be lowered into the ditch, generally by means of hoists, and buried.

What is claimed is:

1. A method of insulating a substantially horizontally oriented pipeline comprising the steps of: positioning a mold around a section of the pipeline at a distance therefrom approximately equal to the desired thickness of insulation, said mold being open at the top; supplying a foamable polyurethane insulating material to said mold and allowing the said foamable material to foam and stiffen leaving a substantially continuous deficient area at the upper area of the pipeline; removing the mold; and supplying additional foamable polyurethane insulating material to the said substantially continuous deficient area at the upper area of the said pipeline to fully cover said pipe.

2. The method of claim 1 wherein the deficient areas at the top of the pipeline are insulated by pouring foamable liquid material onto the deficient areas.

References Cited

UNITED STATES PATENTS

| | | | |
|---|---|---|---|
| 2,857,931 | 10/1958 | Lawton | 264—45 X |
| 3,258,512 | 6/1966 | Flower | 264—45 |
| 3,380,213 | 4/1968 | Hartman | 264—45 X |
| 3,007,208 | 11/1961 | Urban | 264—45 |
| 3,359,351 | 12/1967 | Bender | 264—45 |
| 3,366,718 | 1/1966 | Komada | 264—45 |
| 3,439,075 | 4/1969 | Baner | 264—45 |
| 3,394,207 | 7/1968 | Andersen | 264—45 |
| 3,394,797 | 7/1968 | Flannigan | 264—45 X |
| 3,480,493 | 11/1969 | Bauer | 264—45 U X |

DONALD J. ARNOLD, Primary Examiner

P. A. LEIPOLD, Assistant Examiner

U.S. Cl. X.R.

136—Dig. 9; 264—46, 129